United States Patent
Bergeron et al.

(10) Patent No.: US 9,261,594 B2
(45) Date of Patent: Feb. 16, 2016

(54) WAVEFRONT COMPENSATION IN OPTICAL SYNTHETIC APERTURE IMAGING PROCESSORS

(75) Inventors: Alain Bergeron, Québec (CA); Linda Marchese, Québec (CA); Michel Doucet, Saint-Augustin-de-Desmaures (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 340 days.

(21) Appl. No.: 13/822,335

(22) PCT Filed: Sep. 29, 2010

(86) PCT No.: PCT/IB2010/054394
§ 371 (c)(1),
(2), (4) Date: Mar. 12, 2013

(87) PCT Pub. No.: WO2012/042298
PCT Pub. Date: Apr. 5, 2012

(65) Prior Publication Data
US 2013/0176167 A1 Jul. 11, 2013

(51) Int. Cl.
*G01S 13/90* (2006.01)
*G01S 15/89* (2006.01)
(Continued)

(52) U.S. Cl.
CPC ......... *G01S 13/9005* (2013.01); *G01S 15/8904* (2013.01); *G01S 15/8997* (2013.01); *G01S 17/895* (2013.01); *G02B 27/0087* (2013.01);
(Continued)

(58) Field of Classification Search
CPC .................................................. G01S 13/9005
See application file for complete search history.

(56) References Cited

U.S. PATENT DOCUMENTS

| | | | | | |
|---|---|---|---|---|---|
| 5,079,555 | A | * | 1/1992 | Turpin | 342/25 A |
| 5,384,573 | A | * | 1/1995 | Turpin | 342/179 |

(Continued)

FOREIGN PATENT DOCUMENTS

EP    1517158 B1    4/2010

OTHER PUBLICATIONS

Linda Marchese, Michel Doucet, Bernd Hamisch, Martin Suess, Pascal Bourqui, Mathieu Legros, Nichola Desnoyers, Ludovic Guillot, Luc Mercier, Maxime Savard, Anne Martel, François Châteauneuf and Alain Bergeron, "A real-time high-resolution optical SAR processor", Proc. SPIE 7669, 76690M (2010), Orlando, Florida, USA, Apr. 5, 2010.

(Continued)

*Primary Examiner* — Matthew M Barker
(74) *Attorney, Agent, or Firm* — Norton Rose Fulbright Canada LLP

(57) ABSTRACT

There is provided a System and method of wavefront compensation in a synthetic aperture imaging system. A return signal data representative of a signal reflected by a target area to be imaged is received. A compensation phase figure corresponding to a wavefront compensation to be applied is provided. The compensation phase figure is added or otherwise applied to the phase pattern of the return signal data in order to obtain a compensated phase pattern. An optical beam is spatially modulated according to the compensated phase pattern to produce a modulated optical beam such that the compensation phase figure produces a wavefront compensation on the optical beam. An image of the target area is optically generated using the modulated optical beam.

20 Claims, 10 Drawing Sheets

(51) Int. Cl.
*G01S 17/89* (2006.01)
*G02B 27/00* (2006.01)
*G02B 27/58* (2006.01)
*G03H 1/02* (2006.01)
*G02B 26/06* (2006.01)

(52) U.S. Cl.
CPC ............... *G02B 27/58* (2013.01); *G02B 26/06* (2013.01); *G02F 2203/12* (2013.01); *G03H 2001/0224* (2013.01)

(56) References Cited

U.S. PATENT DOCUMENTS

| | | | |
|---|---|---|---|
| 5,736,958 A * | 4/1998 | Turpin | 342/179 |
| 5,751,243 A * | 5/1998 | Turpin | 342/179 |
| 6,366,356 B1 * | 4/2002 | Brosnan et al. | 356/477 |
| 6,421,163 B1 * | 7/2002 | Culver et al. | 359/279 |
| 6,525,875 B1 * | 2/2003 | Lauer | 359/371 |
| 6,608,584 B1 * | 8/2003 | Faulkner | 342/25 R |
| 6,744,950 B2 * | 6/2004 | Aleksoff | 385/48 |
| 7,265,712 B2 * | 9/2007 | Merkel et al. | 342/195 |
| 7,728,757 B2 | 6/2010 | Cho | |
| 7,865,083 B1 * | 1/2011 | Stevens | 398/91 |
| 8,184,279 B2 * | 5/2012 | Feldkhun | 356/217 |
| 2008/0084551 A1 * | 4/2008 | Harnisch | 356/4.01 |
| 2008/0144473 A1 * | 6/2008 | Morimoto | 369/112.02 |
| 2010/0109938 A1 | 5/2010 | Oswald et al. | |
| 2012/0008181 A1 * | 1/2012 | Cable et al. | 359/9 |
| 2012/0119943 A1 * | 5/2012 | Bergeron et al. | 342/25 F |
| 2012/0218140 A1 * | 8/2012 | Bergeron et al. | 342/25 A |

OTHER PUBLICATIONS

Marchese, L.; Doucet, M.; Hamisch, B.; Suess, M.; Bourqui, P.; Desnoyers, N.; Legros, M.; Mercier, L.; Guillot, L.; Bergeron, A.; , "Full scene SAR processing in seconds using a reconfigurable optronic processor," Radar Conference, 2010 IEEE, pp. I362-I364, May 10-14, 2010.

\* cited by examiner

WAVEFRONT COMPENSATION IN OPTICAL SYNTHETIC APERTURE IMAGING PROCESSORS

TECHNICAL FIELD

The invention relates to the field of synthetic aperture imaging systems, and more particularly to optical processing used in synthetic aperture imaging systems.

BACKGROUND

Synthetic Aperture Radar (SAR) imaging systems are widely used in aerial and space reconnaissance. Usually, an aircraft or a spacecraft is provided with a SAR imaging system which transmits radar pulses and collects radar echoes corresponding to the radar pulses reflected by a target area to be imaged.

Due to the large amount of data generated by a SAR system, optical solutions have been developed for processing the SAR raw data. For example, an image from the SAR raw data can be generated by optical signal processing using a spatial light modulator. However, wavefront aberrations may occur in the SAR optical signal processing system due to variations of optical parameters due for example to manufacturing tolerances, misalignment of optical components, temperature changes, vibrations and degradations caused by launch and in-flight conditions. Parameter variations in the SAR imaging system, such as an altitude change or a change in the atmosphere for example, may also result in wavefront aberrations. In some optical SAR signal processing systems, the position of optical components may be varied in order to compensate for such parameters variations. However, the requirement for moving the optical components reduces the sturdiness and viability for the optical SAR raw signal processing system.

Therefore there is a need for a method and a system for compensating for a parameter variation in a SAR imaging system.

SUMMARY

There is provided a system and method of wavefront compensation in a synthetic aperture imaging system. A return signal data representative of a signal reflected by a target area to be imaged is received. A compensation phase figure corresponding to a wavefront compensation to be applied is provided. The compensation phase figure is added or otherwise applied to the phase pattern of the return signal data in order to obtain a compensated phase pattern. An optical beam is spatially modulated according to the compensated phase pattern to produce a modulated optical beam such that the compensation phase figure produces a wavefront compensation on the optical beam. An image of the target area is optically generated using the modulated optical beam.

In accordance with one embodiment, there is provided a method for optically processing signal data in a synthetic aperture imaging system, the method comprising: receiving return signal data representative of a signal reflected by a target area to be imaged, said signal data comprising an amplitude pattern and a phase pattern; providing a compensation phase figure corresponding to a wavefront compensation to be applied; applying said compensation phase figure to said phase pattern of said return signal data in order to obtain a compensated phase pattern; spatially modulating an optical beam according to said compensated phase pattern to produce a modulated optical beam, said compensation phase figure producing a wavefront compensation on said optical beam; and optically generating an image of said target area using said modulated optical beam.

In accordance with another embodiment, there is provided a system for optically processing signal data in a synthetic aperture imaging system, the system comprising: an input for receiving a return signal data representative of a signal reflected by a target area to be imaged, said signal data comprising an amplitude pattern and a phase pattern; a control unit having an addition module for adding compensation phase figure corresponding to a wavefront compensation to be applied to said phase pattern of said return signal data in order to obtain a compensated phase pattern; and an optical signal processor comprising: a light source for generating an optical beam having a wavefront; a spatial light modulator for spatially modulating said optical beam according to said compensated phase pattern to produce a modulated optical beam, said compensation phase figure producing a wavefront compensation on said optical beam; and a processing optics for optically generating an image of said target area using said modulated optical beam.

Methods and systems are described herein in the context of Synthetic Aperture Radar (SAR) imaging systems. It is however noted that the provided methods and systems also apply to other types of synthetic aperture imaging systems. For example, the provided methods and systems may be used with synthetic aperture SONAR (SAS) systems, synthetic aperture LIDAR systems, synthetic aperture terahertz systems or synthetic aperture infrared systems.

Accordingly, the term "return signal" used herein is intended to include, not limitedly, a radar signal, a SONAR signal, a LIDAR signal, a terahertz signal or an infrared signal.

BRIEF DESCRIPTION OF THE DRAWINGS

FIG. 7 comprises FIG. 7A, FIG. 7B and FIG. 7C wherein

It will be noted that throughout the appended drawings, like features are identified by like reference numerals.

DETAILED DESCRIPTION

Figure 1:
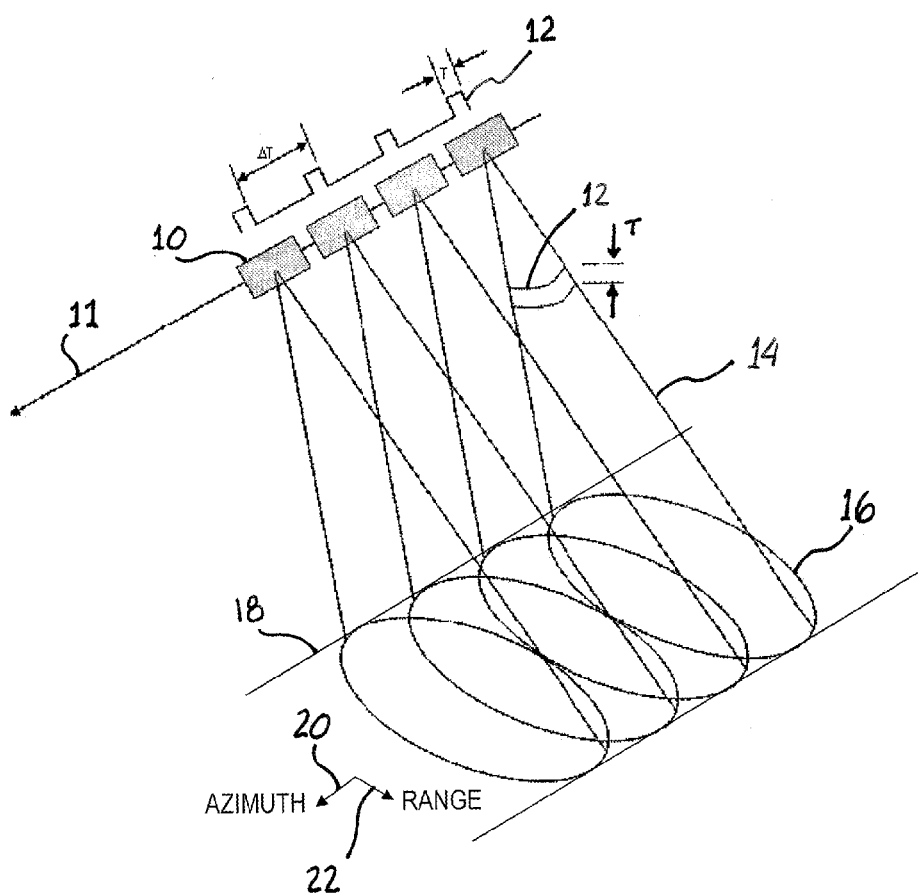
FIG. 1 is a schematic illustrating a SAR imaging system imaging a target area.

Now referring to the drawings, FIG. 1 illustrates a satellite 10 provided with a SAR imaging system (not shown). The satellite 10 is in orbit above a target area to be imaged, such as the ground surface of the earth for example. The satellite 10 is traveling along a satellite flight path 11 while imaging the target area. The SAR imaging system is adapted to emit successive electromagnetic radar signal pulses 12 in direction of the target area. Each radar pulse 12 is characterized by a pulse duration T and two successive radar pulses 12 are temporally spaced apart by an inter-pulse duration ΔT. The pulse duration T and the inter-pulse duration ΔT defines a pulse repetition frequency which corresponds to the repetition rate of the outgoing radar pulses 12. The emitted radar pulses 12 form a radar beam 14 which illuminates the target area to be imaged. The area of the target area which intersects the radar beam 14 is referred to as the footprint 16 of the radar beam 14. While FIG. 1 illustrates an oval footprint 16, it should be understood that the footprint 16 may have other shapes. For example, the footprint 16 may be round. While the satellite 10 is moving along the satellite flight path 11, the footprint 16 is moving, thereby defining a swath 18. The swath 18 is characterized by a length in an azimuth direction 20 and a width in a range direction 22. The azimuth direction 20 corresponds to the propagation direction of the radar beam 14, i.e. the direction of the flight path 11, and the range direction 22 is the direction normal to the azimuth direction 20 and generally parallel to the target area. When reaching the target area, the radar pulses 12 are reflected to give rise to radar echoes. The radar echoes are collected by the SAR imaging system and then referred to as SAR raw data or more generally as return signal data. The SAR raw data is optically processed by the optical SAR signal processor or the SAR imaging system in order to generate an image of the target area.

The SAR imaging system mounted in the satellite 10 is provided with at least one emitting antenna for emitting the pulses 12. The same emitting antenna may also be used for detecting the radar echoes reflected on the target area or a separate receiving antenna can be used for collecting the radar echoes.

An image is generated by superposing a plurality of radar echoes within the range and azimuth of the SAR antenna footprint 16. The received echoes are converted by the SAR imaging system into electrical signals or digital data which are referred to as SAR raw data. The SAR raw data is a two-dimensional array, with one dimension corresponding to the range data while the other corresponds to the azimuth signal history. The SAR raw data is then optically processed by the optical SAR signal processor to reconstruct an image of the target area. A high resolution in the azimuth direction is achieved without requiring large antennas by using a plurality of radar echoes and by applying SAR signal processing. SAR signal processing allows synthesizing a large aperture antenna. SAR signal processing can be mathematically described as a correlation or a filtering process on all of the radar echoes received during an aperture time.

The optical SAR signal processor is generally designed according to the specific parameters of the configuration of the SAR imaging system. Example relevant parameters are the squint angle, the altitude of the SAR imaging system, the pulse repetition frequency, the range sampling frequency, the slant range distance, and the like. The squint angle corresponds to the angle between the radar beam center and the normal to the flight path. The pulse repetition frequency is defined as the number of pulses transmitted per second by the SAR system. The range sampling frequency or radar sampling frequency is the frequency at which the SAR system samples the radar return signal (echo) from the ground The slant range distance corresponds to the distance between the SAR radar system and the target area to be imaged. Optical elements of the optical SAR signal processor and their relative distances are selected according to these and other specific parameters. Accordingly, variations of these parameters due for example to misalignments, manufacturing tolerances, to temperature changes, vibrations and degradations caused by launch and in-flight conditions cause wavefront aberrations in the optical SAR signal processor which result in distortions in the reconstructed image. Wavefront aberrations may also occur due to variations of optical parameters of the optical SAR signal processor.

Figure 2:
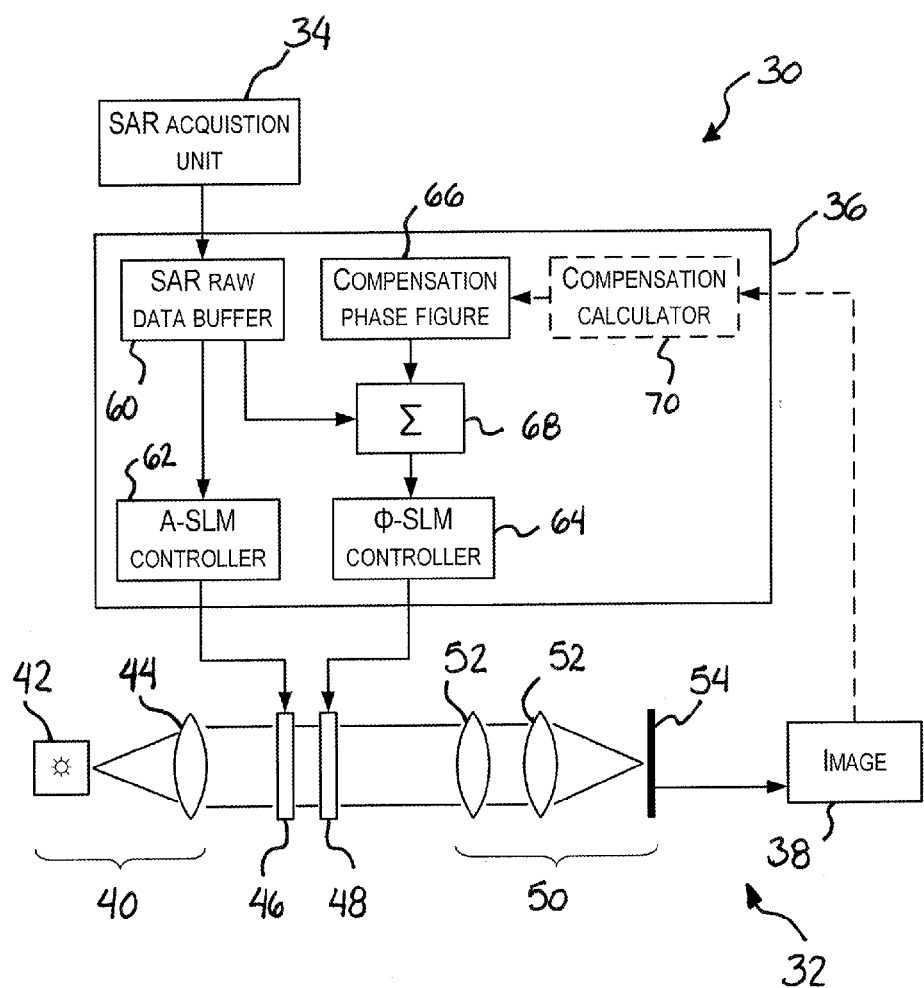
FIG. 2 is a block diagram illustrating a SAR imaging system using an optical SAR signal processor for processing SAR raw data with optical wavefront compensation, in accordance with one embodiment.

FIG. 2 illustrates an example embodiment of a SAR imaging system 30 using an optical SAR signal processor 32 for processing SAR raw data with optical wavefront compensation. A SAR acquisition unit 34 generates SAR raw data generally as known in the art by emitting radar signal pulses toward the target area to be imaged, receiving the radar echoes reflected on the target area and acquiring the radar echoes as electrical signals or digital data referred to as the SAR raw data. The SAR raw data is two-dimensional complex data and comprises a two-dimensional amplitude pattern and a two-dimensional phase pattern. A control unit 36 receives the SAR raw data, compensates the phase pattern of the SAR raw data to perform wavefront compensation and controls the optical SAR signal processor 32 as a function of the SAR raw data in order for the optical SAR signal processor 32 to optically process the SAR raw data and generate an image 38 of the target area.

The optical SAR signal processor 32 optically processes the SAR raw data. It comprises a light source 40 for generating an optical beam, an amplitude Spatial Light Modulator (SLM) 46 and a phase SLM 48 for spatially modulating the optical beam according to the SAR raw data and the wavefront compensation, and processing optics 50 for optically generating an image of the target area from the modulated optical beam.

The light source comprises a light emitting device 42, typically a laser such as a laser diode, which produces a divergent coherent optical beam and collimation optics 44 for collimating the optical beam into a planar wavefront optical beam. The light source 40 may further comprise other optical components such as filtering optics for example.

The amplitude SLM 46 modulates the optical beam according to the amplitude pattern of the SAR raw data and the phase SLM 48 modulates the optical beam according to the compensated phase pattern of the SAR raw data. Accordingly, wavefront compensation is directly performed within the phase SLM 48, thus requiring no additional optical component. The amplitude and phase SLMs 46, 48 are transmission modulators comprising a plurality of addressable pixels controlled by the control unit 36. By controlling the individual pixels of the SLMs 46, 48, the amplitude and phase patterns of the SAR raw data are displayed on the SLMs 46, 48 to spatially modulate the optical beam. The modulated optical beam thereby bears the information of the SAR raw data. In one embodiment, each SLM 46, 48 consist of a liquid crystal display. The amplitude SLM 46 modulates the optical beam in amplitude while the phase SLM 48 modulates the optical beam in phase. Other types of SLMs may also be used such as micro mirror SLMs, electro-optic SLMs and magneto-optic SLMs for example. The pixels of each SLM 46, 48 are arranged in a two-dimensional array, a first dimension corresponding to the range data while the other corresponds to the azimuth signal history.

The processing optics 50 for optically generating an image of the target area from the modulated optical beam comprises focusing optics 52 with different focal lengths for the range and the azimuth axes for focusing the modulated optical beam in the range and azimuth directions. This operation which corresponds to range and azimuth compression produces an image of the target area on a light detection device 54.

The focusing optics 52 typically comprises cylindrical and spherical optics. The light detection device 54 typically consists of a CCD but other types of light detection devices may be used as well, such as a CMOS detector for example.

The processing optics 50 may further comprise diffraction stop optics to remove the diffraction pattern of the optical beam caused by the SLMs 46, 48, a DC component and/or artifacts of a carrier frequency if used. Diffraction stop optics may comprise a Fourier lens and a spatial filter for example.

Further details about suitable optical SAR signal processors are generally known in the art.

The control unit 36 for controlling the optical SAR signal processor 32 as a function of the SAR raw data and a wavefront compensation comprises a buffer 60 typically of the type First In, First Out (FIFO) which receives the SAR raw data and buffers it until ready for processing by the optical SAR signal processor 32. The buffer 60 buffers both the amplitude and the phase pattern of the SAR raw data. In this embodiment, the amplitude pattern is directly applied to the amplitude SLM 46 through an amplitude-SLM controller 62 which addresses pixels of the amplitude SLM 46 to modulate the optical beam according to the amplitude pattern. An addition module 68 receives the phase pattern and a compensation phase figure 66 and numerically adds them together to generate a compensated phase pattern to perform wavefront compensation. The compensated phase pattern is applied to the phase SLM 48 through a phase-SLM controller 64 which addresses pixels of the phase SLM 48 to modulate the phase front of the optical beam with the compensated phase pattern. The compensation phase figure 66 is generally stored in memory. In one embodiment, the compensation phase figure 66 is calculated during a prior calibration run performed on the ground. In this case, the calibration phase figure may be calculated using an external processing unit. In another embodiment, the compensation phase figure 66 is characterized on-board during a mission. In order to perform such a characterization, the control unit 36 may further comprise a compensation calculator 70 for calculating the compensation phase figure corresponding to the wavefront compensation to be applied. As discussed hereinafter, the compensation phase figure 66 is typically calculated with feedback from an image 38 produced with a calibration SAR raw data.

Figure 3:
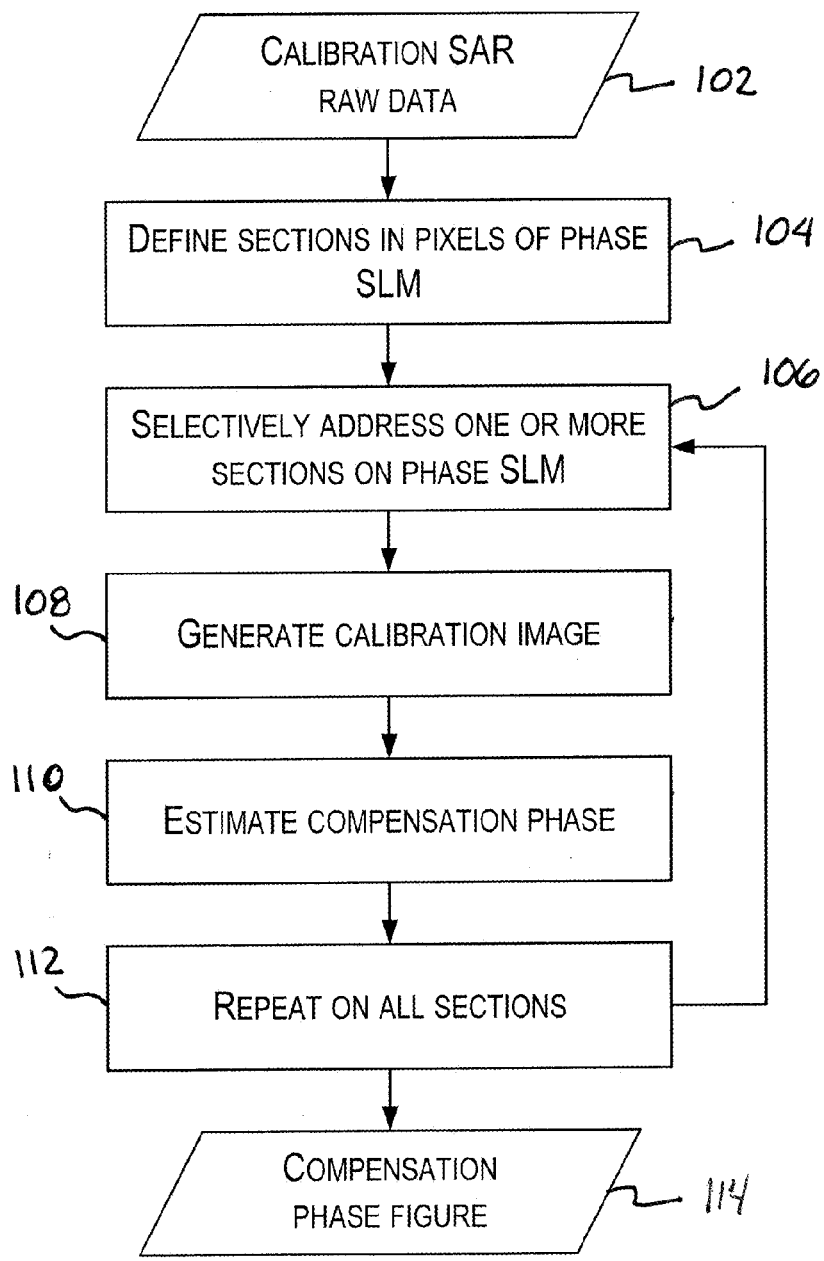
FIG. 3 is a flow chart illustrating a method for generating a compensation phase figure for use in the system of FIG. 2 to perform wavefront compensation, in accordance with one embodiment.

FIG. 3 shows a method for generating the compensation phase figure 66 in order to perform wavefront compensation in accordance, for example, with the system of FIG. 2. The method is performed using the SAR imaging system 30 to be characterized, such as the system of FIG. 2 for example. The compensation phase figure 66 is estimated from calibration SAR raw data 102. In one embodiment, the calibration SAR raw data 102 is previously obtained by numerically emulating a known target, which corresponds to a known reference image, and generating the SAR raw data, referred to as the calibration SAR raw data 102, that would correspond to this known target. In step 104, a plurality of sections is defined on the phase SLM 48 such that each section comprises a sub-group of the pixels of the phase SLM 48. The sections define a two-dimensional array of sections on the phase SLM 48. In step 106, the pixels of one or more sections are selectively addressed with the phase pattern of the calibration SAR raw data 102. All other pixels are turned off, i.e. addressed with a blocked signal transmission. In step 108, an image, which is referred to as the calibration image, is then optically produced by the optical SAR signal processor 32. In step 110, considering the known reference image, a phase compensation corresponding to the one or more sections addressed is then estimated from the calibration image produced, based on a difference between the known image and the produced calibration image. In step 112, steps 106, 108 and 110 are repeated so as to cover all sections. In 114, the combination of all estimated phase compensations defines the compensation phase figure.

Now referring to FIGS. 4 to 10, an example of the method of FIG. 3 for generating the compensation phase figure 66 is described in more detail. In this example method, two sections of the phase SLM 48 are addressed simultaneously so as to make them interfere. This method is also performed using the SAR imaging system 30 to be characterized, such as the system of FIG. 2 for example. The compensation phase figure 66 is estimated from calibration SAR raw data 202. In one embodiment, the calibration SAR raw data 202 is previously obtained by numerically emulating a known target, which corresponds to a known reference image. In this example embodiment, the known target is a theoretical point target. The known reference image is thus an image of a point target. Calibration SAR raw data corresponding to such a known target is easily calculated. It is noted that the phase pattern corresponding to such a point target is generally rotationally symmetric with a center of symmetry.

Figure 5:
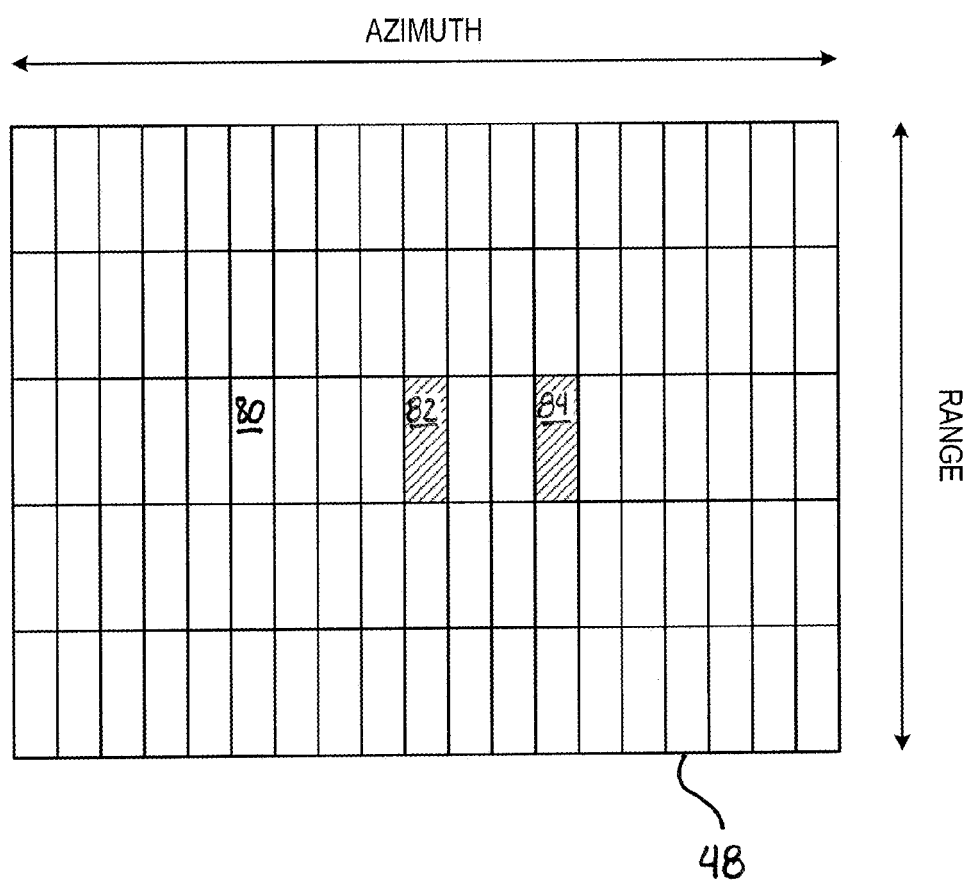
FIG. 5 is a schematic illustrating a phase Spatial Light Modulator (SLM) of the system of FIG. 2, as divided in 19×5 sections.

In step 204, a plurality of sections is defined on the phase SLM 48 such that each section comprises a sub-group of the pixels of the phase SLM 48. FIG. 5 shows the phase SLM 48 as divided in 19×5 sections. As shown in FIG. 5, in one embodiment, the phase SLM 48 is an array of 1920×1080 pixels, separated in 19×5 sections 80. A reference section 82 is defined. It typically corresponds to the center of the phase SLM 48 so as to correspond to the center of symmetry of the phase pattern. When one section 80 of the 19×5 sections is addressed for evaluation of the wavefront compensation, it is then referred to as an evaluated section 84. Of course, the number of pixels on the SLM and the number of sections defined may vary.

Figure 4:
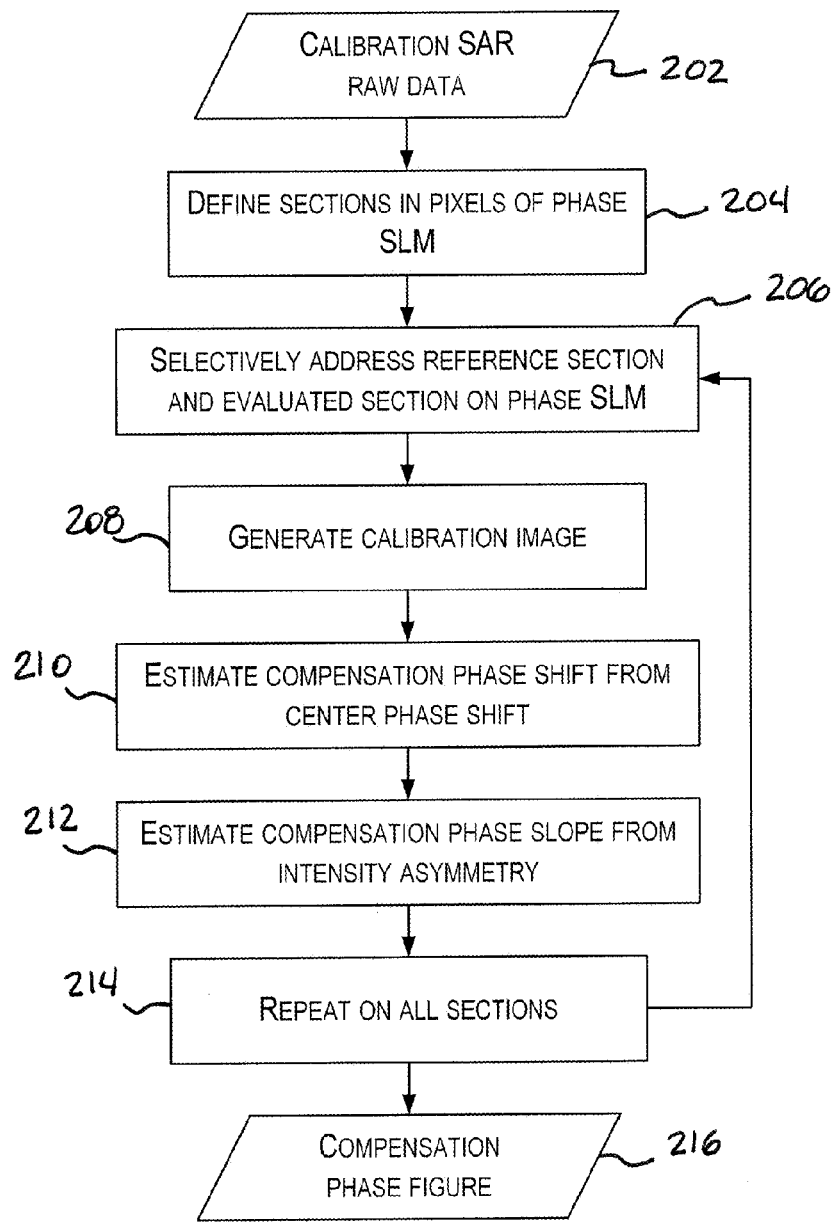
FIG. 4 is a flow chart illustrating an example method for generating a compensation phase figure wherein a reference section and an evaluated section interfere to produce an interference pattern.
Figure 6:
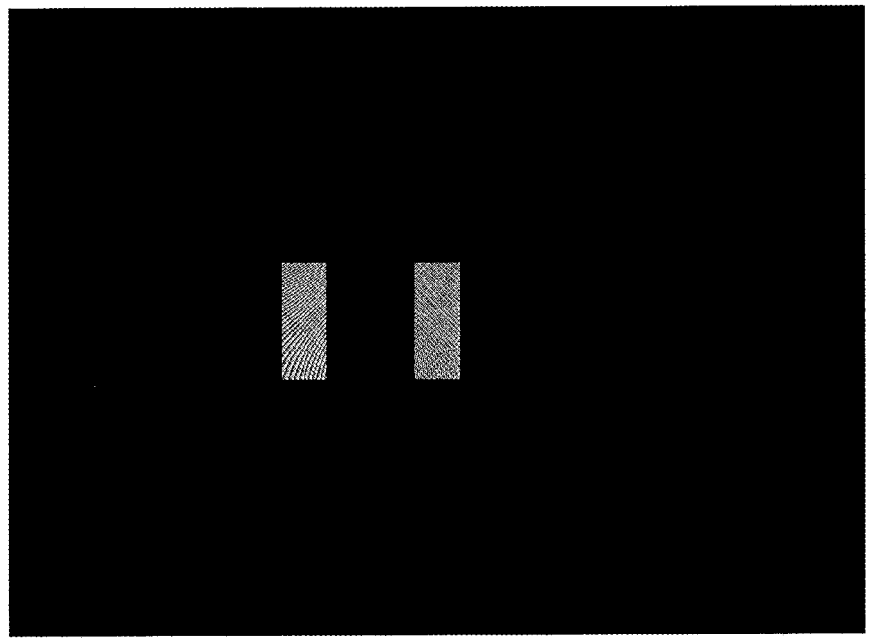
FIG. 6 is an image of a phase pattern as displayed on the phase SLM of FIG. 5 in the case of an evaluated section that is on the central row of the phase SLM.

Back to FIG. 4, in step 206, pixels of the reference section 82 and an evaluated section 84 are selectively addressed with the phase pattern of the calibration SAR raw data 202. All other pixels are turned off. FIG. 6 shows an example of a phase pattern then displayed on the phase SLM 48 in the case of an evaluated section that is on the central row of the phase SLM 48.

Figure 7A:
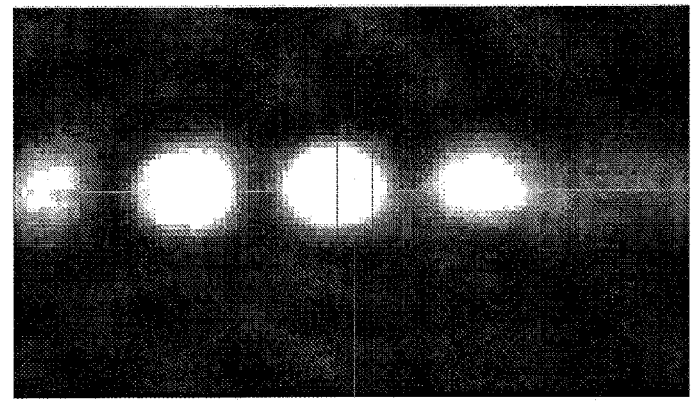
FIG. 7A is an image of the interference pattern corresponding to the phase pattern of FIG. 6 as appearing on the calibration image.

In step 208, the calibration image is produced by the optical SAR signal processor 32. The calibration image is an interference pattern corresponding to the interference of the reference section 82 and the evaluated section 84. As mentioned above, the known reference image is a point target. Due to interference, when addressing the reference section 82 with an evaluated section 84, the point target is deformed and spatially repeats on the interference pattern. FIG. 7A shows the interference pattern corresponding to the phase pattern of FIG. 6, as appearing on the calibration image. Due to wavefront aberrations, the center of the point target is shifted toward the left and the intensity distribution has a left-right asymmetry.

In step 210, the phase compensation shift corresponding to the evaluated section 84 is estimated by evaluating the center phase shift in the interference pattern relative to the known reference image. Referring to FIG. 7A, a phase shift of $2\pi$ would correspond to the distance between two repetitions of the point target on the interference pattern. The center phase shift of the interference pattern may then be evaluated in a relative manner.

Figure 7B:
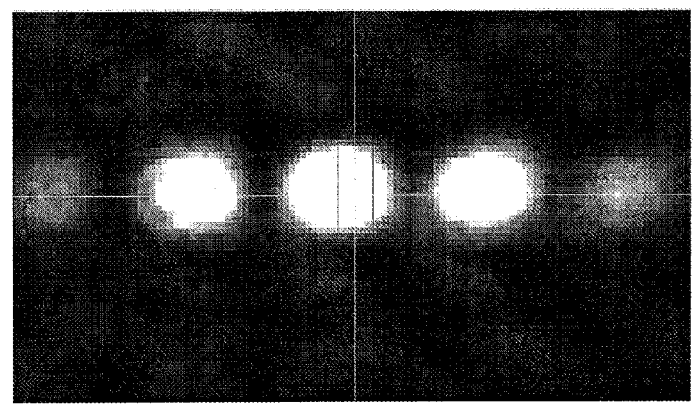
FIG. 7B is an image showing the interference pattern of FIG. 7A after phase slope compensation.
Figure 7C:
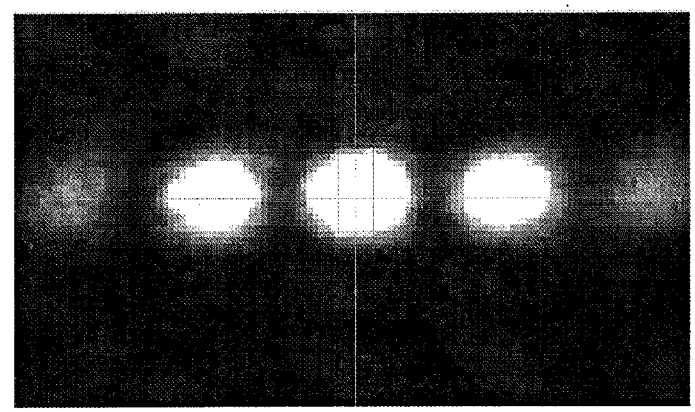
FIG. 7C is an image showing the interference pattern of FIG. 7A after both phase shift compensation and phase slope compensation.

In step 212, the phase slope compensation within the evaluated section 84 is estimated by evaluating the intensity asymmetry of the interference pattern. FIG. 7B shows the interference pattern of FIG. 7A after phase slope compensation. The phase compensation slope to be applied is the one which result in a symmetrical interference pattern. FIG. 7C shows the interference pattern of FIG. 7A after both phase shift compensation and phase slope compensation.

Figure 8:
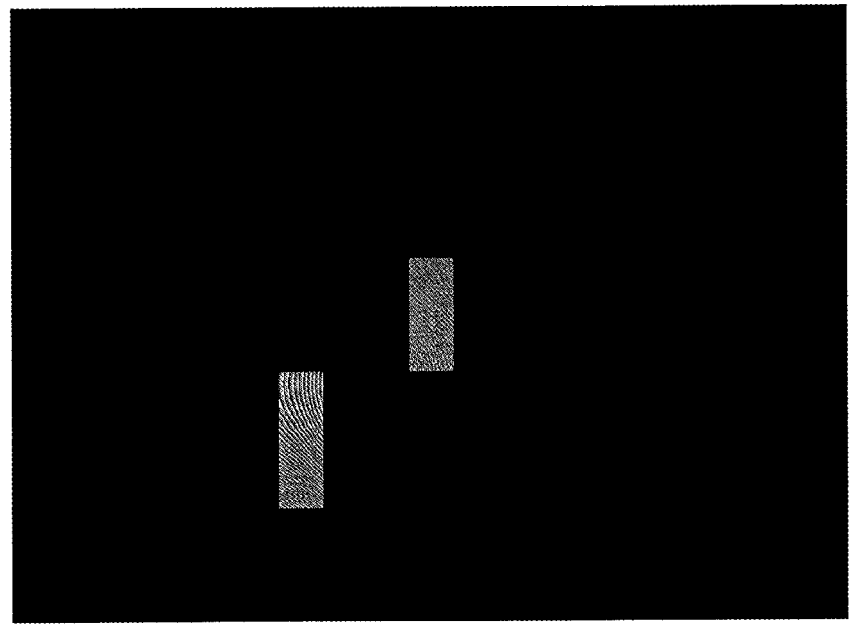
FIG. 8 is an image of another phase pattern as displayed on the phase SLM in the case of an evaluated section that is arbitrarily located on the phase SLM.
Figure 9:
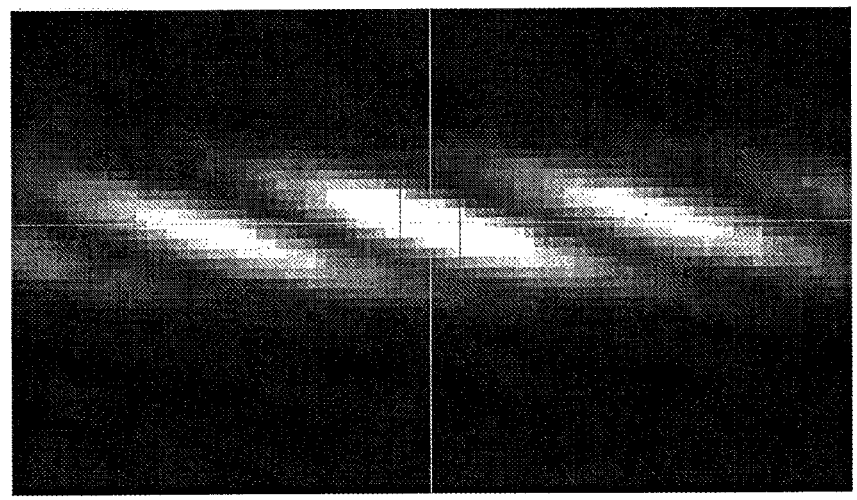
FIG. 9 is an image of the interference pattern corresponding to the phase pattern of FIG. 8 as appearing on the calibration image.

FIG. 8 shows another phase pattern displayed on the phase SLM 48 in the case of an evaluated section 84 that is arbitrarily located on the phase SLM 48. In this case, the evaluated section is diagonal relative to the reference section 82. In accordance with step 206, pixels of the reference section 82 and of the evaluated section 84 are selectively addressed with the phase pattern of the calibration SAR raw data 202 and all other pixels are turned off. FIG. 9 shows the interference pattern corresponding to the phase pattern of FIG. 8, as appearing on the calibration image. The fringe patterns appear diagonal but the phase shift compensation and the phase slope compensation are still estimated according to steps 210 and 212 above by evaluating a phase shift and an intensity distribution in the interference pattern of FIG. 9.

Figure 10:
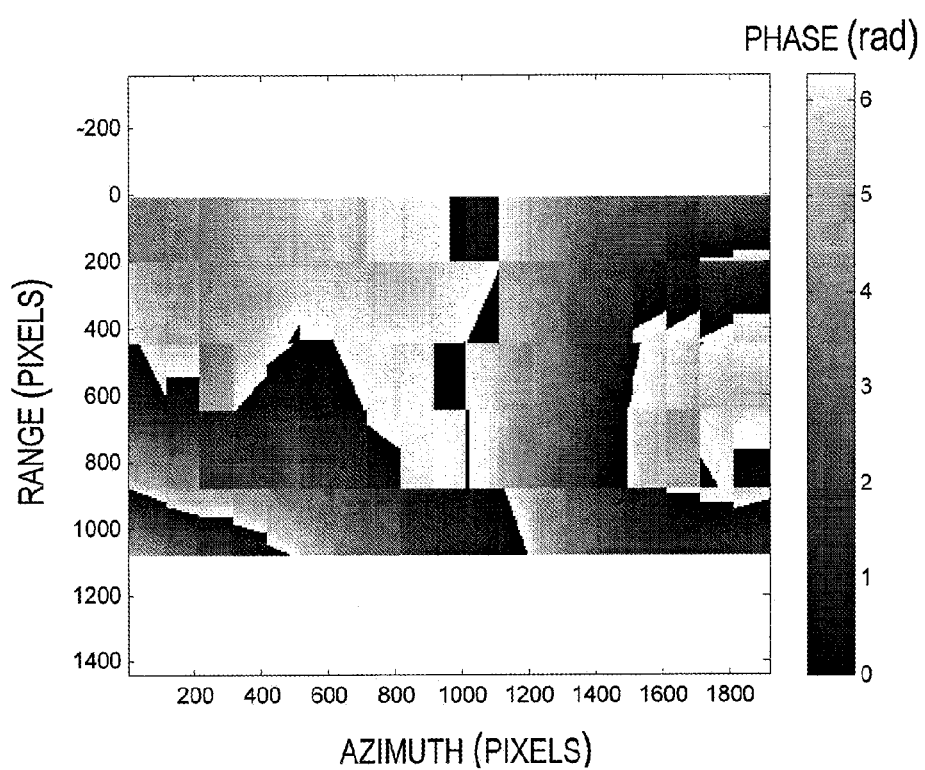
FIG. 10 is a graph showing an example of a compensation phase figure as obtained with the method of FIG. 4.

In step 214, steps 206, 208, 210 and 212 are repeated so as to cover all sections 80. In 214, the combination of all estimated phase compensations defines the compensation phase figure. FIG. 10 shows an example of a resulting compensation phase figure. A black color in a section 80 indicates a zero phase while a white color indicates a $2\pi$ phase, with greyscale interpolation in-between.

It is noted that in another embodiment, instead of step 212 of estimating the phase slope compensation from the intensity distribution, only the phase shifts are evaluated (from step 210) and a curve fit may be used to interpolate compensation phase between the centers of the sections 80.

Figure 11:
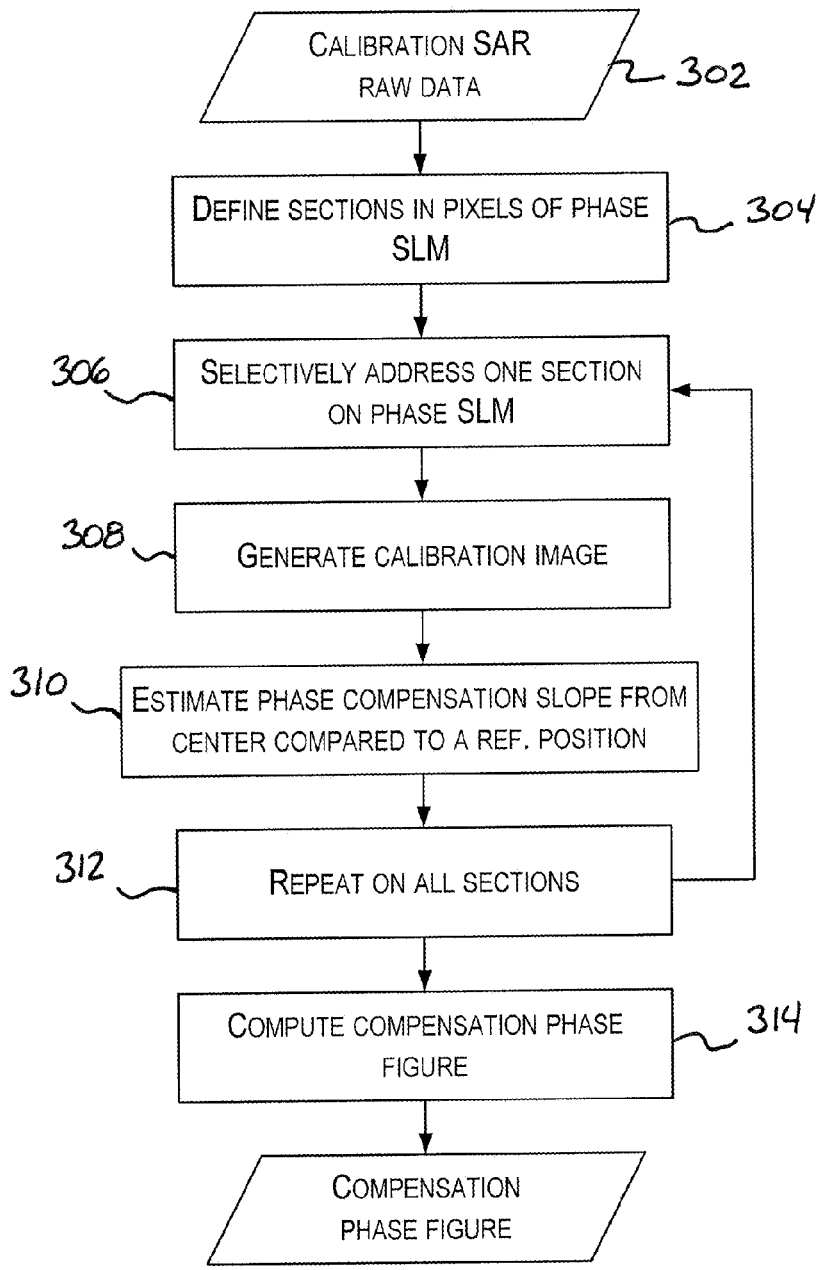
FIG. 11 is a flow chart illustrating another example method for generating a compensation phase figure wherein a single evaluated section is used at a time.

Now referring to FIG. 11, another example of the method of FIG. 3 for generating the compensation phase figure 66 is described in more detail. In this method, instead of making an evaluated section to interfere with a reference section, each evaluated section is considered alone, i.e. without interference with a reference section. It is noted that this method will typically apply better to wavefronts with slowly-varying features.

The method of FIG. 11 is also performed using the SAR imaging system 30 to be characterized, such as the system of FIG. 2 for example. The compensation phase figure 66 is estimated from calibration SAR raw data 302. As in the method of FIG. 4, in one embodiment, the calibration SAR raw data 302 is previously obtained by numerically emulating a known target, which corresponds to a known reference image. In this example embodiment, the known target is a theoretical point target. The known reference image is thus an image of a point target.

In step 304, a plurality of sections is defined on the phase SLM 48 such that each section comprises a sub-group of the pixels of the phase SLM 48, as in step 204 of the method of FIG. 4. However, no reference section is used.

In step 306, pixels of one evaluated section only are selectively addressed with the phase pattern of the calibration SAR raw data 302. All other pixels are turned off.

In step 308, the calibration image is produced by the optical SAR signal processor 32. The individual display of each section on the phase SLM 48 allows for isolation of the small portion of the nearly spherical wavefront converging on the image without interference. The calibration image resulting from isolation of the small portion of the spherical wavefront can be considered as a portion of a spherical wavefront and, due to aberrations, its center of curvature is not coincident with the center of intensity of the point target on the known reference image. The center of intensity of the calibration image is thus not aligned with the center of intensity of the known reference image.

In step 310, a phase compensation slope corresponding to the evaluated section is estimated by comparing the center of intensity of the calibration image, i.e. corresponding to the small portion of the wavefront, with a reference position. The phase compensation slope to be applied corresponds to the slope of a linear phase variation which, when added to the selectively addressed section, results in the alignment of the center of intensity of the calibration image with the reference position. It is noted that the center of intensity may be calculated as the mass center, the geometric center or the maximum intensity pixel for example. All sections are evaluated with reference to the same reference position. In one embodiment, the reference position is the centroid of the image as obtained when processing the calibration SAR raw data 302 without wavefront compensation and without segmentation. In another embodiment, the reference position is the centroid of the image obtained when processing the section that is in the center of the phase SLM 48. Other reference positions may be used as well.

In step 312, steps 306, 308 and 310 are repeated so as to cover all sections. A matrix of phase compensation slope values is then obtained, with one value per evaluated section. In step 314, the compensation phase figure is determined by computing a continuous phase function that has local slopes which corresponds to the estimated phase compensation slope values. The obtained continuous phase function defines the compensation phase figure.

It is noted that in some embodiments described above with reference to FIGS. 4 to 11, the compensation phase figure is estimated by numerically emulating a known target that is a point target. The known target is therefore a theoretical point target. In other embodiments, instead of using an emulated known target, a real calibration target as present on the ground is used. In accordance with such embodiments, one or more known calibration targets are present on the ground and can be used for in-flight calibration. The known calibration targets typically correspond to point targets especially disposed on ground for the purpose of performing in-fight calibration. Positions of known calibration targets on the ground are therefore known or predetermined. The known reference image corresponding to a known calibration target is generally known since it corresponds to the image of a point target.

When a calibration is to be performed, the SAR imaging system needs to pass above one of the known calibration targets in order to be allowed to acquire SAR data from the known calibration target. The SAR imaging system receives as an input the position of the known calibration target on the ground. The exact position may be communicated from a ground station, from an in-flight control unit or may be stored in memory in the SAR imaging system for later use in wavefront calibration. When passing above the known calibration target, the SAR imaging system acquires SAR raw data corresponding to this known calibration target via its SAR acquisition unit. One of the wavefront calibration methods described above is then used to calculate the compensation phase figure. This method allows for not only compensating for wavefront aberrations that result from the optical SAR signal processor, i.e. due to variations of optical parameters for example, but also for wavefront aberrations that are resulting from parameter variations in the SAR acquisition unit, such as an altitude change for example.

In yet another embodiment, wavefront calibration as described herein with reference to FIG. 2 is used to compensate for the absence of an optical element that is being eliminated from the optical SAR signal processor 32. In order to reduce the cost, the weight or the dimensions of the optical SAR signal processor 32, one of its optical elements is eliminated and replaced by an equivalent phase correction function which is applied to the optical beam by using this phase correction function as the compensation phase figure 66. In this case, the compensation phase figure 66 may compensate for both aberrations and the absence of the eliminated optical element. The compensation phase figure 66 which compensates for both aberrations and the absence of the eliminated optical element may be estimated, for example, using any of the methods described herein in reference to FIGS. 4 to 11.

It should be understood that changes may be made to the systems and methods described herein. For example, while the embodiments described herein use both an amplitude SLM 46 and a phase SLM 48, a single SLM may be used to implement both the amplitude and the phase modulations. As well, in specific cases, the amplitude SLM may be omitted so that no amplitude modulation is being performed. It is also possible to implement the phase pattern modulation and the wavefront compensation with separate SLMs in cascade, a first SLM being used to apply the phase pattern modulation and a second SLM to apply the wavefront compensation. No addition module 68 is then necessary.

It should be understood that the systems and methods described herein can be used as well with interferometric SARs and non-interferometric SARs.

While the present description refers to a Synthetic Aperture Radar (SAR), it should be understood that the methods and systems described above can be applied to any adequate synthetic aperture imaging system, such as a synthetic aperture SONAR (SAS), a synthetic aperture LIDAR, a synthetic aperture terahertz system, a synthetic aperture infrared system, or the like.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

The invention claimed is:

1. A method for optically processing signal data in a synthetic aperture imaging system, the method comprising:

receiving return signal data representative of a signal reflected by a target area to be imaged, said signal data comprising an amplitude pattern and a phase pattern;

providing a compensation phase figure corresponding to a wavefront compensation to be applied;

applying said compensation phase figure to said phase pattern of said return signal data in order to obtain a compensated phase pattern;

spatially modulating an optical beam according to said compensated phase pattern to produce a modulated optical beam, said compensation phase figure producing a wavefront compensation on said optical beam; and optically generating an image of said target area using said modulated optical beam.

2. The method as claimed in claim 1, wherein said providing a compensation phase figure comprises:

i) receiving calibration return signal data corresponding to a known reference image, said calibration return signal data comprising an amplitude pattern and a phase pattern;

ii) defining a plurality of sections on a spatial light modulator;

iii) selectively addressing part only of said sections with said phase pattern of said calibration return signal data to spatially modulate said optical beam and produce a calibration modulated optical beam;

iv) receiving a calibration image optically generated using said calibration modulated optical beam;

v) estimating a phase compensation corresponding to said part of said sections from said calibration image and said known reference image; and vi) repeating steps iii), iv) and v) with other parts of said sections to provide said compensation phase figure using a combination of estimated phase compensations.

3. The method as claimed in claim 2, wherein said applying comprises numerically adding said compensation phase figure to said phase pattern of said return signal data.

4. The method as claimed in claim 2, wherein said spatially modulating comprises addressing a plurality of pixels of said spatial light modulator with said compensated phase pattern to display said compensated phase pattern on said spatial light modulator to spatially modulate a phase front of said optical beam accordingly.

5. The method as claimed in claim 4, wherein said return signal data comprises a two-dimensional return signal pattern, one dimension of said signal pattern corresponding to range data and the other dimension of said signal pattern corresponding to azimuth signal history; and wherein said pixels are arranged in a two-dimensional array, one dimension of said array corresponding to said range data and the other dimension of said array corresponding to said azimuth signal history.

6. The method as claimed in claim 2, wherein said part comprises a reference section and an evaluated section and said calibration image comprises an interference pattern.

7. The method as claimed in claim 6, wherein said phase compensation is estimated by evaluating a phase shift in said interference pattern relative to said known reference image.

8. The method as claimed in claim 6, wherein a slope of said phase compensation within said evaluated section is estimated by evaluating an asymmetry of an intensity distribution in said interference pattern.

9. The method as claimed in claim 2, wherein said part comprises a single section and said phase compensation is estimated by evaluating a shift of a center of intensity of said calibration image relative to a reference point.

10. The method as claimed in claim 2, wherein said known reference image corresponds to a point target.

11. The method as claimed in claim 2, further comprising:
inputting a position of a known calibration target on the ground which corresponds to said known reference image;
acquiring said calibration return signal data from said known calibration target using a synthetic aperture acquisition unit; and
whereby said method compensates for a parameter variation in at least one of an optical signal processor used for said optically generating an image and said synthetic aperture acquisition unit.

12. The method as claimed in claim 2, wherein said method compensates for an absence of an optical element that is being eliminated from an optical synthetic signal processor used for said optically generating an image.

13. The method as claimed in claim 2, further comprising spatially modulating said optical beam according to said amplitude pattern of said return signal data to produce said modulated optical beam as modulated in phase and amplitude; and wherein said optically generating an image of said target area is performed using said modulated optical beam as modulated in phase and amplitude.

14. The method as claimed in claim 2, wherein said signal comprises a radar signal.

15. A system for optically processing signal data in a synthetic aperture imaging system, the system comprising:
an input configured to receive a return signal data representative of a signal reflected by a target area to be imaged, said signal data comprising an amplitude pattern and a phase pattern;
a control unit having an addition module configured to add a compensation phase figure corresponding to a wavefront compensation to said phase pattern of said return signal data in order to obtain a compensated phase pattern; and
an optical signal processor comprising:
a light source configured to generate an optical beam having a wavefront;
a spatial light modulator configured to spatially modulate said optical beam according to said compensated phase pattern to produce a modulated optical beam, said compensation phase figure producing a wavefront compensation on said optical beam; and
focusing optics configured to optically generate an image of said target area using said modulated optical beam.

16. The system as claimed in claim 15, further comprising a compensation calculator configured to calculate said compensation phase figure corresponding to said wavefront compensation.

17. The system as claimed in claim 15, wherein said spatial light modulator comprises a plurality of addressable pixels controlled according to said compensated phase pattern to display said compensated phase pattern on said spatial light modulator to spatially modulate a phase front of said optical beam accordingly.

18. The system as claimed in claim 17, wherein said return signal data comprises a two-dimensional return signal pattern, one dimension of said signal pattern corresponding to range data and the other dimension of said signal pattern corresponding to azimuth signal history; and wherein said pixels are arranged in a two-dimensional array, one dimension of said array corresponding to said range data and the other dimension of said array corresponding to said azimuth signal history.

19. The system as claimed in claim 15, wherein said spatial light modulator comprises a phase modulator configured to spatially modulate said optical beam according to said compensated phase pattern and an amplitude modulator configured to spatially modulate said optical beam according to said amplitude pattern of said return signal data, to produce said modulated optical beam as modulated in phase and amplitude.

20. The system as claimed in claim 15, wherein said signal comprises a radar signal.

* * * * *